US008644509B2

(12) United States Patent
Paillier et al.

(10) Patent No.: US 8,644,509 B2
(45) Date of Patent: Feb. 4, 2014

(54) DATA PROVIDING PROCESS BASED ON AN IBPE SCHEME

(75) Inventors: Pascal Paillier, Paris (FR); Aline Gouget, Paris (FR)

(73) Assignee: Gemalto SA, Meudon (FR)

( * ) Notice: Subject to any disclaimer, the term of this patent is extended or adjusted under 35 U.S.C. 154(b) by 88 days.

(21) Appl. No.: 13/133,550

(22) PCT Filed: Aug. 27, 2009

(86) PCT No.: PCT/EP2009/061075
§ 371 (c)(1),
(2), (4) Date: Jun. 8, 2011

(87) PCT Pub. No.: WO2010/069624
PCT Pub. Date: Jun. 24, 2010

(65) Prior Publication Data
US 2011/0243328 A1    Oct. 6, 2011

(30) Foreign Application Priority Data

Dec. 15, 2008    (EP) .................................. 08305942

(51) Int. Cl.
*H04L 29/00*    (2006.01)
(52) U.S. Cl.
USPC .......................................... 380/255; 713/171

(58) Field of Classification Search
USPC ........................................ 380/255; 713/171
See application file for complete search history.

(56) References Cited

U.S. PATENT DOCUMENTS 7,921,292 B1 * 4/2011 Pauker et al. ................. 713/171

OTHER PUBLICATIONS

International Search Report (PCT/ISA/210) issued on Nov. 12, 2009, by European Patent Office as the International Searching Authority for International Application No. PCT/EP2009/061075.
Written Opinion (PCT/ISA/237) issued on Nov. 12, 2009, by European Patent Office as the International Searching Authority for International Application No. PCT/EP2009/061075.
M. Green et al., "Identity-Based Proxy Re-encryption", Applied Cryptography and Network Security, [Lecture Notes in Computer Science; LNCS], Jun. 5, 2007, pp. 288-306, vol. 4521.

* cited by examiner

*Primary Examiner* — Brandon Hoffman
*Assistant Examiner* — Michael D Anderson
(74) *Attorney, Agent, or Firm* — Buchanan Ingersoll & Rooney PC

(57) ABSTRACT

The present invention is a method to ensure a secure exchange of crypted numeric data between two entities, where their decryption depends to the approval of a third entity. The solution uses a combination of Identity Based Encryption scheme, and transcription trap use.

12 Claims, 1 Drawing Sheet

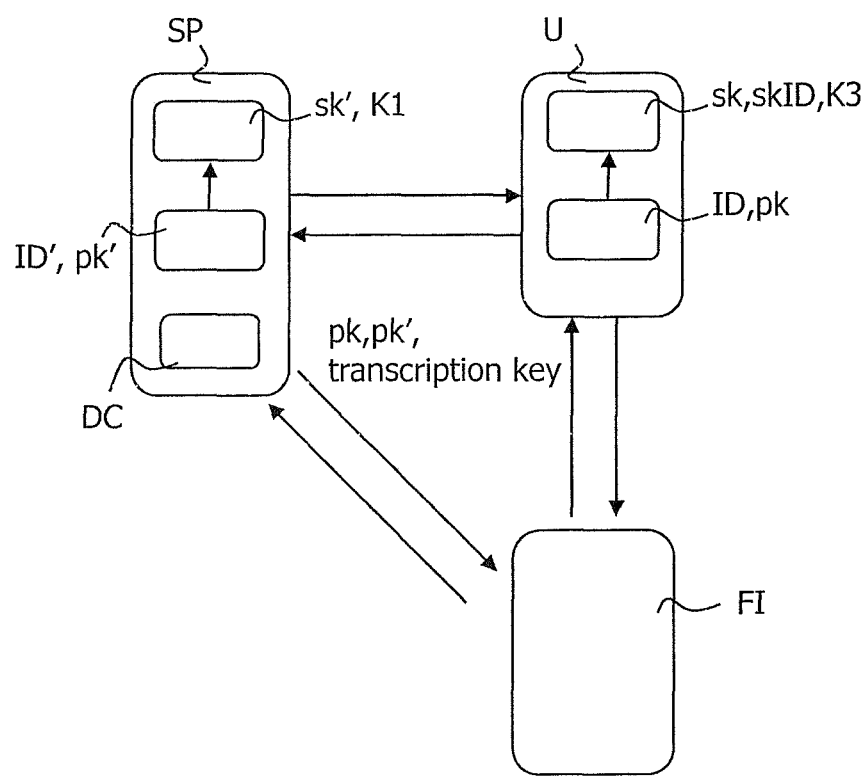

DATA PROVIDING PROCESS BASED ON AN IBPE SCHEME

The invention relates to content-providing process based on an IBPE (Identity Based Proxy Encryption) scheme.

More specifically the invention is a cryptographic mechanism that permits to freely transmit protected content, and to provide on an other way, personal means to access this content in clear.

This invention takes place in the context of massive data exchanges, like Video on Demand (VOD), virtual software providing, and in all situations where a same content can be distributed to several users, but with digital rights management.

The invention makes use of an Identity Based Proxy Encryption (IBPE) Scheme built upon two cryptographic primitives: an Identity Based Encryption scheme (IBE) scheme and a Proxy Encryption (PE) Scheme.

- An IBE scheme is a public-key cryptosystem wherein any string is a valid public key (with respect to a private key generator). In particular, email addresses and dates can serve as public keys.
- A PE scheme is a public-key encryption scheme with an additional feature: the ability to generate public "transcription keys" such that the knowledge of a transcription key $\pi[A \to B]$ related to users A and B allows a third party to convert any ciphertext that has been encrypted with the public key of user A to a ciphertext that can be decrypted by user B. Note that the third party cannot recover the plaintext message and can only "transcript" ciphertexts.
- Then, an IBPE scheme is an IBE scheme supporting the ability to generate public "transcription keys".

The invention makes use of the IBE Technology to avoid the need for certificates. Indeed, most of the time, a user has to manage several public keys or certificates since in practice every institution or organization wants to manage by itself the certification or the delivery of public keys. Public-key identity-based encryption allows the encryption of a message using the recipient's identity as a public key. The ability to use identities as public keys avoids the need for distributing certificates. This is a most critical issue for applications where the recipient is unable to present a public-key certificate at encryption time (e.g. secure email). Moreover, in IBE schemes, the secret keys are delivered by the organizations/institutions and not generated by the users. When for some reason a secret key is erased, the user has to ask again the organization/institution to re-deliver his secret key.

The identities used in IBE schemes can be chosen to include attributes or to express access conditions. For instance, an organization may decide to customize the format of user identities as "user name||organization||deadline". Thus, in an IBE infrastructure, every user has to manage his several identities IDi, and thus must store as many secret keys delivered by the organizations/institutions belonging to the infrastructure.

The invention specifically applies to the following context:

- A single user is given at least one secret key related to his identity delivered by an institution/organization and stored in a secure device with limited secure storage memory.
- At any time, a user has access to many ciphertexts (e.g. encrypted contents are publicly available on a server, or can be transmitted "on-demand" upon request to an on-line server) such that the public keys used to encrypt these contents are not necessarily related to a secret key known by the user. The user is not necessarily able to decrypt these ciphertexts.
- At any time, a user U can get the "right" (e.g. by proceeding to a payment) to decrypt a ciphertext denoted by Ci that has been encrypted using the public key pki. In this case, the user receives, or contribute to the construction of a transcription key $\pi[pki \to U]$. This transcription key is a public data that can be transmitted and stored in a non-secure memory. In addition, if lost the transcription key can be re-generated by the institution/organization. Note that the knowledge of $\pi[pki \to U]$ only is not enough to decrypt Ci.

The invention aims at securing a transaction between a service provider (SP), a user (U), and a financial institution (FI).

- SP may provide video on demand, MP3, software, pics, games, etc. FI can be paypal, an online bank, etc.
- U and SP both trust FI.
- U and SP do not necessarily know each other before the transaction.

The technical problem solved by the invention is a means to securely deliver a service to a user with at least one of the following features:

- SP does not need to register U in advance.
- There is no need for a secure channel between U and SP.
- U can obtain a "locked" service from SP (e.g. download an encrypted movie) without involving FI. U can unlock the service at a later time (e.g. 2 weeks after the download) without involving SP, but only FI (e.g. by paying FI for the movie).
- Anybody can check the validity of the transaction without requiring access to the private information of either U, SP or FI (only public session informations suffice). If the transaction fails, anybody can determine which party aborted or attempted to cheat.

In addition, the proposed solution permits to aggregate an unlimited number of secret keys into a constant-size secret key (the size of the aggregated secret key is identical to that of a single secret key). Two application cases are of particular interest:

a) When the device features a possibly large non secure memory (e.g. flash memory) and a limited secure memory where all the secret keys cannot be stored simultaneously. This is the case of flash cards where the flash is external to the core and therefore insecure, as well as for low cost USB tokens equipped with a tiny secure memory zone.

b) When the embedded application makes it possible to delegate public storage to a remote server.

Some solutions have been studied to try to solve the problem described above. Most of them make use of an identity-based proxy encryption scheme.

In a proxy encryption scheme, a semi-trusted proxy server can convert, using a transcription key, a ciphertext computed under Alice's public key into one that can be opened by Bob's secret key without seeing the underlying plaintext nor revealing the secret decryption keys of Alice and Bob.

The most commonly mentioned application of proxy encryption is the email-forwarding (i.e. e-mail messages delivered to a given e-mail address can be converted and transmitted to another given e-mail address).

A symmetric proxy encryption is a proxy-encryption scheme where the transcription key is bilateral whereas an asymmetric proxy encryption scheme allows only unidirectional conversion. Since any asymmetric proxy scheme can be used as a symmetric proxy scheme, the cryptographic community did not further investigate the design of symmetric proxy encryption schemes and naturally focused on achieving asymmetric and/or non-interactive properties (i.e. Alice's secret key and Bob's public key suffice to construct the transcription key).

Very few proxy encryption schemes have been proposed in the identity-based setting and all of these are asymmetric (asymmetric proxy function/key is not necessarily mandatory in our setting). The main drawbacks of the proposed asymmetric schemes are either that the ciphertext size expands linearly with respect to the number of transcriptions or the number of transcriptions is inherently limited.

BRIEF DESCRIPTION OF DRAWING

The exemplary embodiment of the disclosed system and method can be better understood with reference to the following sole FIGURE and description. The components in the FIGURE are not necessarily to scale, emphasis instead being placed upon illustrating the principles of the exemplary embodiment. The sole FIGURE illustrates a high level diagram of a system and bi-directional communication between entities of the system.

The invention aims at securing a transaction between a first actor, called service provider (SP), a second actor called user (U), and a third actor, called financial institution (FI).

SP may provide any numeric data that is controlled using rights management. For example these data could be video on demand, MP3, software, pics, games, etc.

FI is the actor that « grants » rights to the user. During a financial scheme, this actor is the organism attesting that the user can access the content because the bill has been well paid. For example FI can be the paypal organism, or an online bank, etc.

U is the actor that is willing to access the content provided by SP. In a common use case, U is the final customer who wishes to view a film, or to install a software program.

A prerequisite is that U and SP both trust FI.

U and SP do not necessarily know each other before the transaction.

The technical problem solved by the invention is a means to securely deliver a service to a user with at least one of the following features:

SP does not need to register U in advance.

There is no need for a secure channel between U and SP.

U can obtain a "locked" service from SP (e.g. download an encrypted movie) without involving FI. U can unlock the service at a later time (e.g. 2 weeks after the download) without involving SP, but only FI (e.g. by paying FI for bying access to the movie to FI).

Anybody can check the validity of the transaction without accessing private information of U, SP or FI (only public session informations suffice). If the transaction fails, anybody can determine which party aborted or attempted to cheat.

We assume that all the organizations/institutions within the system make use of the same identity-based encryption scheme (e.g. Boneh-Franklin, Boneh-Boyen, Waters, etc.).

In an Identity-Based Encryption scheme, users request keys from a trusted party known as a Private Key Generator (PKG). At key generation/delivery time, each user U of the system either receives a secret key denoted by sk related to his identity denoted by pk (possibly with extra data included into it) from a PKG, or U can generate their own PKG and thus generate their own secret key directly on-card. The user's device stores the secret key sk in secure memory.

Once a new IBE secret key sk' is received, the device creates a public transcription key from pk' to pk. That transcription key allows to convert a ciphertext that can be decrypted with sk' into a ciphertext that can be decrypted with sk. The conversion is performed without the knowledge of the plaintext nor the secrets sk and sk' and above all, is a public operation since the transcription key is public.

Thus, depending on the application, the user's device can either store the transcription key in non secure memory or delegate its storage to an untrustworthy remote server. The key sk' within the device can be destroyed although the abilities to decrypt messages with respect to sk and sk' are both maintained.

Once a new transcription key $\pi[pki \rightarrow U]$ is received, the user can either store it in a non secure memory or delegate its storage to an untrustworthy remote server. If the user needs the transcription key $\pi[pki \rightarrow U]$ to decrypt only one ciphertext Ci (that has been encrypted using the identity pki), the user can also decide to first convert Ci to an encrypted file that can be decrypted using the secret key related to the identity U and then destroy the transcription key $\pi[pki \rightarrow U]$.

If a transcription key is corrupted, the user may detect corruption for instance by decrypting to a junk message or because the ciphertext will be found invalid at decryption time. Transcription keys may also be stored MAC-ed with a secret key only known by the device and checked for consistency before use. When a transcription key is corrupted, the user will ask the corresponding organization/institution to transmit the secret key once again in order to decrypt the ciphertext and re-compute the corresponding transcription key.

At any time, the user may decide to update the aggregated secret sk and replace it by sk". The user has then to re-compute all the new transcription keys from the old transcription keys, sk and sk", but there is no need to recover sk' and all the secret keys that have been destroyed.

The system allows the coexistence of several trusted parties known as Private Key Generators (PKGs). Every organization/institution is a PKG and every user can also be a PKG towards themselves. We now show an overview of an implementation example of the invention.

We make the assumption that every PKG within the system uses the same identity-based proxy-encryption scheme and the same following common public parameters.

Let $G_T$ be a group of prime order q, and $G_1 = <g>$ and $G_2 = <g>$ two groups for which there exists an efficiently (non-degenerate) computable bilinear map into $G_T$. Additionally, let e: $G_1 \times G_2 \rightarrow G_T$ denote that bilinear map and g be the corresponding generator. $H_1$ and $H_2$ are two standard cryptographic hash functions such that $H_1: \{0,1\}^* \rightarrow G_1$ and $H_2: \{0,1\}^* \rightarrow G_2$. Identities will be represented by bitstrings of length n.

System setup. The common parameters of the system are randomly chosen:

cparams={g, $G_1 = <g>$, $G_2 = <g>$, $G_T$, $H_1$, $H_2$}

At any time, a new PKG can join the system. Every institution/organization or user device that is willing to create its own master key executes the PKG setup algorithm and publishes the public parameters paramsi={cparams, pkPKGi}. The master key skPKGi is kept secret by PKGi. Every PKG is able to create the user secret keys related to his master key. Given an identity ID, the PKG can compute the associated secret key skID by running a user key generation algorithm KeyGen on identity ID. Then the PKG transmits the user secret key skID in a secure way to the user related to ID. Again, since the same user is likely to be given several ID strings, that user may have to collect several secret keys from the same PKG.

Overall, a user may receive several secret keys from several PKGs related to his identity.

Now, to form his aggregated secret key sk, the user can choose for instance the first key he receives or generate his own secret key sk and store it in secure memory (this particular secret key sk may be changed at later time if wanted so by the user). We assume that sk has been generated by PKGi and sk=skID. Whenever the user receives a new secret key skID', he computes a transcription key between the new secret key skID' and the key stored in secure memory skID by executing the TranscriptKeyGen algorithm TranscriptKeyGEN (paramsj, paramsi, skID', skID). The output of this algorithm is the transcription key $\pi[ID' \rightarrow ID]$, the key skID' can be erased from memory and $\pi[ID' \rightarrow ID]$ can be stored in a non-secure memory or sent to an untrustworthy remote server. A user may also receives directly a transcription key $\pi[ID' \rightarrow ID]$ from the PKG, meaning that the user does not necessarily know the secret key related to the identity ID'.

Given a user identity ID, anyone can encrypt a plaintext m under identity ID with parameters paramsi related to PKGi. The encryption is performed using the algorithm Encrypt (paramsi, ID, m).

When a user receives a ciphertext C', he also knows the identity string ID' used during encryption together with the public parameters paramsj of the related PKG.

Either the secret key skID stored in the secure memory is the secret key matching the encryption of this ciphertext (meaning that ID'=ID) and then the user device can directly decrypt using the decryption algorithm Decrypt (paramsi, skID, C'), or it must beforehand transcript the ciphertext C' into a ciphertext C that can be later decrypted using the secret key skID stored in secure memory. In order to do this, the correct transcription key must be used to compute the new ciphertext. If the user does not yet has the appropriate transcription key, he has to buy it. The transcription algorithm Transcript (paramsj, paramsi, $\pi[ID' \rightarrow ID]$, C') can be executed by the user or by a third party. The user could also execute the transcription/decryption algorithm TransDecrypt (paramsj, paramsi, $\pi[ID' \rightarrow ID]$, C', skID) to directly recover the plaintext message m, if available.

More precisely, the invention is a method to secure transfer of encrypted digital content between a first entity SP and a second entity U, which decryption depends on the approval of a third entity FI, this method contains at least the following steps:
encryption, the entity SP owns said digital data encrypted only to be decrypted with decryption key K1,
contact, the entity U establishes contact with the entity FI,
authorization, depending on the result of the contact step, the entity FI establishes a personal decryption permission to the entity U
transmission, the personal decryption permission is transmitted to the entity SP, with at least one information ID on the identity of that entity U
generation, entity SP generates a key K2 associated with the at least one information ID
transcription, the entity SP generates all or part of a transcription trap from the key K1 to the key K2, to modify the said encrypted digital data encryption to become decryptable using a key K3, derived from the information ID.
delivery, the transcription trap is transmitted to the entity U.

The key K2 can be associated with the information ID according to the identity function, it can be associated with the information ID applying an Identity Based Encryption scheme.

The said key K3 can be obtained mixing the key K2 and the information ID, this mixing operation can be a concatenation.

The said key K3 can be associated with the information ID according to the identity function (f(x)=x).

The method, according to the invention, can contain also a step of download digital encrypted data by the entity U. This step can be realized before the contact step, then at least one information about the said digital encrypted data can be transmitted during the contact step. This step can also be realized after the contact step.

The contact step can be a payment step.

Other characteristics and advantages of the present invention will emerge more clearly from a reading of the following description of a number of preferred embodiments of the invention.

We describe here an example of application of the invention. The scheme involves three types of player: a user U, a financial institution FI and a service provider SP.

Let $G_T$ be a group of prime order q and G=<g> be a group for which there exists an efficiently computable bilinear map into $G_T$. Additionally, let e: $G \times G \rightarrow G_T$ denote that bilinear map and g be the corresponding generator (for simplicity, our construction is defined in the symmetric bilinear setting). Let H be a standard cryptographic hash function such that H: $\{0,1\} \rightarrow G$. Identities will be represented as bitstrings of length n. The identity-based encryption scheme used in this illustrative system is the well-known Boneh-Franklin IBE scheme.

The general setup of the system is performed as follows.
System setup. Choose at random the common parameters of the system
cparams={g, G=<g>, $G_T$, H}

We make the assumption that there is only one PKG in the system managed by FI. The financial institution (FI) is trusted by the service provider SP and the users of the system. FI manages user's accounts. Moreover, FI is responsible for giving out decryption rights (via transcription keys): FI debits user's account and credits SP's account.

FI Setup. To generate the scheme parameters for FI, randomly select s←Zq* and publish:
params={cparams, pkFI=$g^s$).
The master key skFI=s is kept secret.

User Registration. Every user U is given a secret key related to his identity delivered by FI and stored in a secure device with limited secure storage memory. FI is able to create the user secret keys related to his master key. Given an identity ID, the FI can compute the associated secret key skID by running a user key generation algorithm KeyGen(params, skFI, ID) for identity ID in $\{0,1\}^*$:
skID=H(ID)$^s$.

Then the FI transmits the user secret key skID in a secure way to the user related to ID. We assume that user U has a means to be authenticated by the FI and that FI holds an account for user U and U has a mean to credit his account (out of the scope of the invention).

The service provider (SP) maintains a huge database of contents (e.g. movies) (stored in a server connected to Internet network) with the following access rights managements:
Read access: all
Write access: restricted to SP For example, the service provider maintained a user-friendly website (connected to the database of movies) in order to encourage users to free download encrypted movies. The movies available on the website are encrypted with different secret keys. In this example, we consider that the encryption key used to encrypt a movie is ID="Movie title". Then, the encrypted file of the movie with title "titlei" and plaintext file mi is:

$Ci=(g^r, mi*e(g^s, H(titlei)^r))$.

When the service provider SP wants to add a new encrypted file mj on the website, SP uses the public key ID=titlej, picks at random $r_j \leftarrow Zq^*$ and computes $ctitlej=(g^{rj}, mj*e(g^s, H(titlej)^{rj}))$ Every user U of the system can download as many encrypted movies as he wants from the SP website (U and SP do not necessarily know each other and SP does not need to register U in advance). Note that, the user needs to buy a transcription key to decrypt the related encrypted movie. U can then obtain a "locked" service from SP (e.g. download an encrypted movie) without involving FI. U can unlock the service at a later time (e.g. 2 weeks after the download) without involving SP, but only FI (e.g. by paying FI for the movie). When user U wants to buy the transcription key $\pi[titlej \rightarrow ID]$, U interacts with FI as follows.

1. U identifies himself to FI (for example by proving the knowledge of $skU=H(U)^s$).
2. U asks FI for the transcription key $\pi[titlej \rightarrow ID]$. (Preferably, U signs his request).

FI checks whether there is enough money on U's account to buy this transcription key. If yes, FI executes the algorithm TranscriptKeyGEN (params, sktitlej, skID) and returns the transcription key $\pi[titlej \rightarrow ID]=H(titrej)^{-s} H(ID)^s$ and a signature $\sigma_{FI}(\pi[titlej \rightarrow ID], data)$ upon payment (paypal etc.).

3. The verification of the validity of $\pi[titlej \rightarrow ID]$ can be publicly performed:

$e(\pi[titlej \rightarrow ID], g)=?e(H(ID)/H(titrej), g^s)$

Anybody can check the validity of the transaction without accessing private information of U, SP or FI (only session information). If the transaction fails, anybody can determine which party cheated. There is no need for a secure channel between U and SP, only an authenticated channel. Note that the knowledge of $\pi[titlej \rightarrow ID]$ allows only the user knowing skID to decrypt Cj.

Assuming that skID is stored in the secure memory of U (for example skID=skU), U stores the transcription key $\pi[titlej \rightarrow ID]$ in a non-secure memory. In addition, if lost the transcription key can be re-generated by the institution/organization (e.g. U may provide the signature $\sigma_{FI}(\pi[titlej \rightarrow ID], data)$.

With the knowledge of $\pi[titlej \rightarrow ID]$, U can execute the algorithm Transcript (paramsi, $\pi[titlej \rightarrow ID]$, Cj). Given a ciphertext $Cj=(c1', c2')$ with $c1'=g^r$ and $c2'=m*e(g^s, H(titlej)^r)$, U computes $$c2 = c2' * e(c1', \pi[titlej \rightarrow ID])$$
$$= m*e(g^s, H(titlej)^r) * e(g^r, \pi[titlej \rightarrow ID])$$
$$= m*e(g^r, H(titlej)^s) * e(g^r, H(titlej)^{-s} H(ID)^s)$$
$$= m*e(g^s, H(HID)^r)$$
$$= m*e(g^r, H(ID)^s).$$

And outputs the ciphertext $C=(c1', c2)=(g^r, m*e(g^r, H(ID)^s))$.

Note that a transcription is more efficient than a decryption followed by a re-encryption.

U can next execute the decryption algorithm Decrypt (paramsi, skID, C). Given a ciphertext C=(c1, c2) with $c1=g^r$ and $c2=m*e(g^r, H(ID)^s))$, and $skID=H(ID)^s$, compute $c2/e(c1, skID)=m*e(g^s, H(ID)^r))/e(g^r, H(ID)^s)=m$ and return plaintext m.

U can also directly transcript/decrypt Cj with the knowledge of $\pi[titlej \rightarrow ID]$ and $skID=H(ID)^s$ by executing the algorithm TransDecrypt (paramsi, $\pi[titlej \rightarrow ID]$, Cj, skID)). Compute $$m = c2'/(e(c1', (\pi[titlej \rightarrow ID]/skID)))$$
$$= m*e(g^r, H(titlej)^s)/(e(g^r, H(H(ID)^s/H(titrej)^{-s} H(ID)^s))$$
$$= m*e(g^r, H(titlej)^s)/(e(g^r, H(titrej)^s))$$
$$= m$$

The invention claimed is:

1. A method to secure transfer of encrypted digital content from a first entity to a second entity, wherein a decryption depends on approval of a third entity, comprising the following steps:
   Generating a secret key related to a first public key, said first public key being generated according to at least one information of an identity of the second entity, said secret key being stored in a secure memory of the second entity;
   encrypting a digital content with a second public key, said second public key being generated according to at least one information of an identity of said content, said encrypted content being decrypted with a decryption key, the decryption key being generated according to the second public key;
   when the third entity grants rights to the second entity to decrypt the encrypted digital content, (i) generating, by a device of the second entity, a public transcription key from the second public key to the first public key so that said public transcription key allows the encrypted content, which is decipherable with the decryption key associated with the second public key, to be converted into an encrypted content which is decipherable with the secret key associated with the first public key and (ii) decrypting the converted encrypted content with the secret key.

2. The method according to claim 1, wherein the secret key is generated by a key generator, the third party or by the second entity.

3. The method according to claim 1, wherein the third entity (i) generates the public transportation key, (ii) executes the conversion of the encrypted content and (iii) transmits the converted encrypted content to the second entity which decrypts it with its secret key.

4. The method according to claim 1 wherein the public transcription key is generated by the third entity and transmitted to the second entity which executes the conversion of the encrypted content.

5. The method according to claim 4 wherein the third entity calculates a signature of the public transcription key and transmits it to the second entity.

6. The method according to claim 1 wherein the public transcription key is generated by the second entity.

7. The method according to claim 4, wherein after the conversion step, the second entity destroys the public transcription key from memory, said memory being one of secure or unsecure.

8. The method according to claim 7 wherein the first public key is associated with the identity of the second entity according to an identity function.

9. The method according to claim 1, wherein the second public key is associated with the information of an identity applying an Identity Based Encryption scheme.

10. The method according to claim 1, wherein the encrypted digital content is downloaded by the second entity before or after the step where the third entity grants the rights to the second entity to decrypt the encrypted digital content.

11. The method according to claim 1, wherein the second entity is authenticated by the third entity before the step of granting the decryption right.

12. The method according to claim 1, wherein the decryption rights are granted upon payment.

* * * * *